United States Patent
Faymon et al.

(10) Patent No.: US 6,798,192 B2
(45) Date of Patent: Sep. 28, 2004

(54) SPEED SENSING SYSTEM WITH AUTOMATIC SENSITIVITY ADJUSTMENT

(75) Inventors: David K. Faymon, Phoenix, AZ (US); Tom G. Mulera, Mesa, AZ (US); Paul M. Stevens, Oro Valley, AZ (US); Mansoor Shah, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 4 days.

(21) Appl. No.: 10/170,525

(22) Filed: Jun. 11, 2002

(65) Prior Publication Data

US 2003/0231013 A1 Dec. 18, 2003

(51) Int. Cl.[7] .................................................. G01P 3/44
(52) U.S. Cl. .................... 324/166; 324/173; 324/207.25
(58) Field of Search ............................ 123/406.58, 617; 327/511, 72; 324/160, 163, 166, 173, 174, 207.12, 207.15, 207.25; 702/148

(56) References Cited

U.S. PATENT DOCUMENTS

| | | | |
|---|---|---|---|
| 3,731,194 A | | 5/1973 | Favin et al. |
| 3,890,957 A | | 6/1975 | Freeman |
| 3,984,713 A | | 10/1976 | Presley |
| 4,112,365 A | | 9/1978 | Larson et al. |
| 4,602,515 A | | 7/1986 | Eichenlaub |
| 5,150,050 A | | 9/1992 | Genheimer et al. |
| 5,287,227 A | | 2/1994 | Cronch et al. |
| 5,446,375 A | * | 8/1995 | Perkins ........................ 324/163 |
| 5,631,999 A | | 5/1997 | Dinsmore |
| 5,896,561 A | | 4/1999 | Schrader et al. |
| 5,977,764 A | | 11/1999 | Riedle et al. |
| 6,304,079 B1 | | 10/2001 | Kenjo et al. |

FOREIGN PATENT DOCUMENTS

| | | |
|---|---|---|
| EP | 0 731 356 A1 | 9/1996 |
| WO | WO 92 08137 A | 5/1992 |
| WO | PCT/US03/19739 | 11/2003 |

* cited by examiner

*Primary Examiner*—Jay Patidar
(74) *Attorney, Agent, or Firm*—Robert Desmond, Esq.

(57) ABSTRACT

An electronic circuit measures a pulse frequency and/or a pulse period of pulses in a sensor signal originating in a sensor coil, the pulses being zero crossing pulses. The circuit includes a filter stage having an input connected to the sensor coil, the filter stage being for removing electrical noise from the sensor signal to provide a filtered sensor signal. The circuit also has a signal strength sensing circuit connected to receive at least one of the sensor signal and the filtered sensor signal, the signal strength sensing circuit producing a variable threshold signal, which is a substantially monotonically non-decreasing function of a strength of the sensor signal. A variable threshold zero crossing detector is connected to receive the filtered sensor signal and the variable threshold signal. The variable threshold zero crossing detector has an upper threshold to test for zero crossing in a positive direction and a lower threshold to test for zero crossing in a negative direction. One or both of the thresholds is dependent on the variable threshold signal. The variable threshold zero crossing detector generates a clean square-wave pulse train indicative of positive and negative zero crossings. The circuit also includes an output circuit generating a signal indicative of the pulse frequency and/or the pulse period.

29 Claims, 9 Drawing Sheets

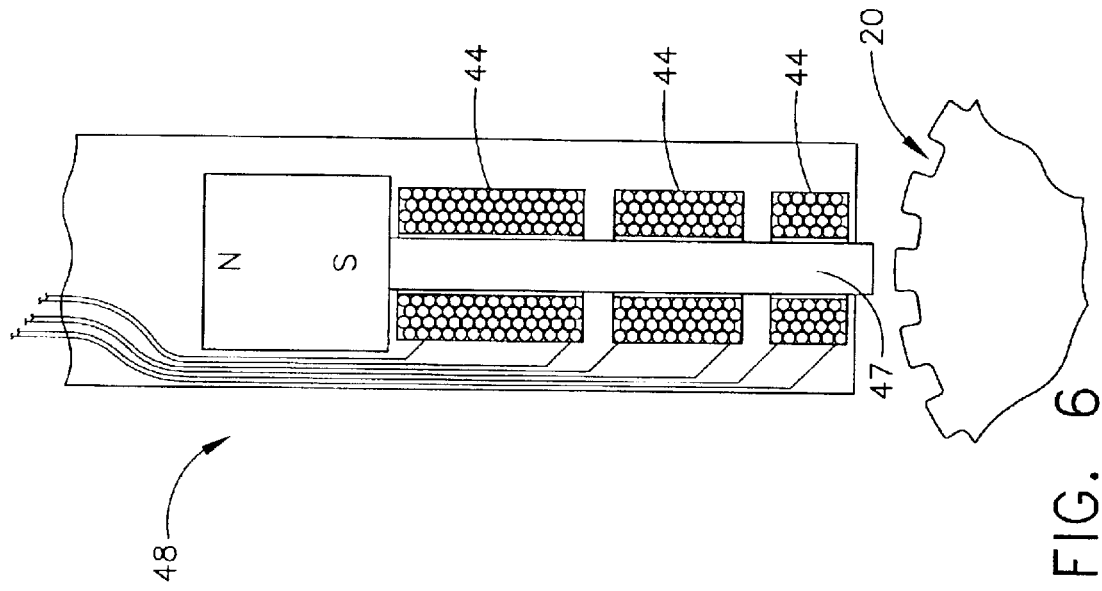
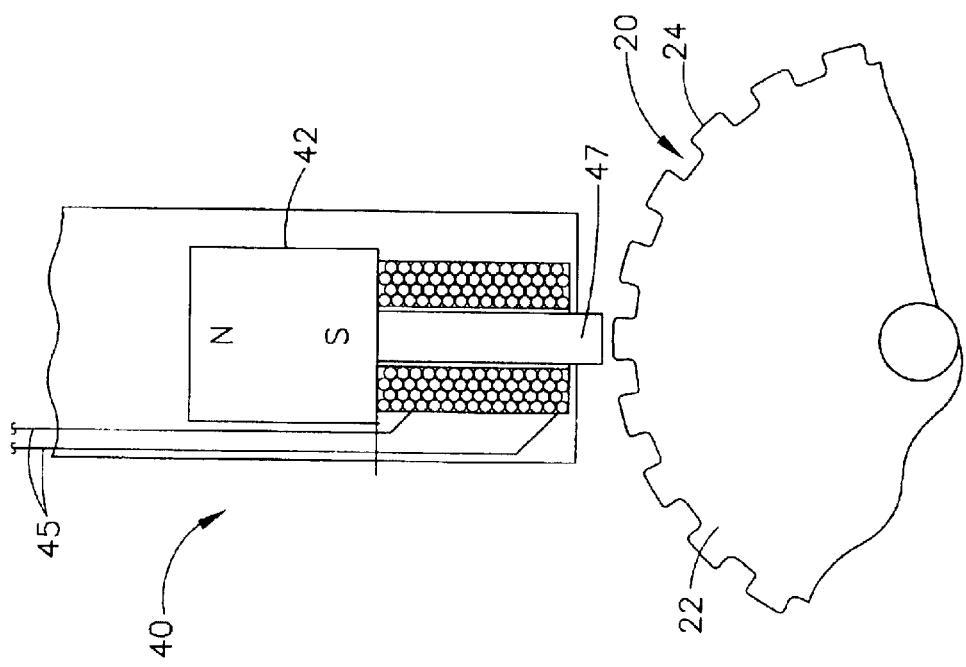
FIG. 6
FIG. 5

SPEED SENSING SYSTEM WITH AUTOMATIC SENSITIVITY ADJUSTMENT

BACKGROUND OF THE INVENTION

The present invention generally relates to methods and apparatus whereby the speed of a moving entity is measured by a magnetic pickup coil subject to variable magnetic fields as ferromagnetic discontinuities on the moving entity move past the magnetic pickup coil and, more specifically, to apparatus and methods for the generation of a clean square-wave pulse train from a noisy signal received from the pickup coil. The ferromagnetic discontinuities generally have no magnetism of their own. They are detected by a passive magnetic sensor which includes a permanent magnet and the magnetic pickup coil.

When a ferromagnetic discontinuity on the moving entity approaches or recedes from the passive magnetic sensor, magnetic flux inside the coil changes and, by Gauss's law, a variable electromotive force (emf) or voltage is generated in the coil. Systems for measuring the speed of a rotating or translating entity are known wherein ferromagnetic discontinuities, which generally have no magnetism of their own, are disposed on the moveable entity, spaced apart in a direction of movement of the entity. One or more passive magnetic sensors are placed adjacent the ferromagnetic discontinuities so that movement of the entity causes electrical pulses to be induced in the sensors as the ferromagnetic discontinuities move past the sensor(s).

For measuring rotary motion, the discontinuities are generally formed in a circular array. For example, a ferromagnetic gear may be placed on a shaft, and the teeth of the gear constitute the ferromagnetic discontinuities. Alternatively, slots or flutes may be formed in a ferromagnetic shaft to delineate the required ferromagnetic discontinuities, which are uncut portions of the shaft between the slots or flutes. In either case, a passive magnetic detector is placed adjacent the ferromagnetic discontinuities so that, as the shaft rotates, the ferromagnetic discontinuities cause variable magnetic flux inside the coil of the detector, and hence generate variable emf's in the coil.

For measuring linear motion, the ferromagnetic discontinuities are generally formed as parallel ridges spaced apart laterally in the direction of motion. The ridges, preferably, lie perpendicular to the direction of motion. A type of gear known as a "rack" may be employed for this purpose.

Since the emf generated by such a coil depends on the rate of change of magnetic flux, such a coil generates a signal that alternates between negative and positive values. If the ferromagnetic discontinuities are uniformly sized and spaced, the emf from the coil will comprise periodic alternating positive and negative segments. It is known to generate a train of clean square-wave pulses from the coil emf. A zero crossing detector is employed for this purpose. When the coil emf crosses zero in the positive direction, the output of the zero crossing detector is set to one level. When the coil emf crosses zero in the negative direction, the output of the zero crossing detector is set to another level. For example, the output may go high for a positive crossing and low for a negative crossing.

In order to reduce the sensitivity of the zero crossing detector to noise, it is known to employ an upper threshold to indicate zero crossing in the positive direction, and a lower threshold to indicate zero crossing in the negative direction. In prior art systems for measuring speed of rotating or translating entities, these thresholds are generally set at fixed, constant values.

It is noted that the signal generated by the pickup coil increases linearly in strength with the speed of the moving entity. Therefore, in prior art systems, as the velocity of the moving entity increases, the signal gets stronger, and the threshold becomes a smaller and smaller fraction of the signal strength. This is inconsistent with a rule of thumb known in the art, namely, that the thresholds should have a magnitude of about one fifth to one eighth of the peak signal strength.

Two prior art patents teach pulse detection systems employing zero crossing detectors with variable thresholds. Both of these patents are for computer disk drive data reading, not for sensing speed of a translating or a rotating body, and neither patent adjusts the threshold as a function of measured signal strength in real time.

U.S. Pat. No. 5,287,227 teaches a manufacturing system in which several points are tested on the disk surface during disk drive manufacture. Thresholds for the zero crossing detector that will later be used to process a signal from the disk reading head are determined based on the quality of the surface points for accepting and retaining a digital test signal. Extrapolation is done for points in between the tested points. The thresholds are stored in memory and written onto the disk during manufacture. Later, when the disk is started up, the thresholds are read from the disk and stored in memory. Then, when data is read from the disk, thresholds are obtained from memory and employed in the zero crossing detector. This invention does not adjust the thresholds in accordance with an ambient noise level or the strength of the signal actually obtained by the read head during reading of the disk.

U.S. Pat. No. 5,150,050 teaches a manufacturing system in which tests are made at points on the disk surface during disk drive manufacture. Thresholds for a zero crossing detector are varied to determine whether a spot on the disk can reliably be written to and read from. If no such threshold can be found for a spot on the disk, the location of the spot is stored and is written onto the disk. Later, when the disk is in use, the bad spots on the disk are not used for storing information. This patent also teaches a system whereby, when a disk data read fails, the threshold is changed by a predetermined amount and a data re-read attempted, in order to recover the data.

It is noted that the use of a zero crossing detector in the references cited differs greatly from the use in a speed sensor employing a pickup coil. The mechanism for detecting a pulse from the pickup head of a disk drive is not a zero crossing detector, but a peak detector. The variable-threshold zero-crossing detector merely enables the peak detector, such that only the first peak after a zero-crossing is counted. The peak detector is mechanized via a zero-crossing detector with a fixed zero-volt threshold acting on a time derivative of the sensed signal.

It is further noted that the references cited do not dynamically compensate for degradation of either the write head or the read head, or a change in signal strength from any other cause, such as height of the heads above the disk, or special misalignments. They furthermore do not dynamically compensate for variations in electrical noise. U.S. Pat. No. 5,287,227 does not compensate at all, while U.S. Pat. No. 5,150,050 compensates only after a data read has failed, adjusting the threshold by pre-determined amounts, rather than constantly adjusting the thresholds in real time to prevent the data read failure in the first place.

As can be seen, there clearly is a need for a speed sensing system employing a passive magnetic sensor which detects pulses of a signal from the sensor by a zero crossing detector having a variable threshold. Such a system would allow use of detectors with weak outputs at low speeds (which are less failure prone due to larger wire sizes) without undue sensitivity to noise at higher speeds, would compensate for degradation of the sensor magnet, variations in spacing of the detector to the ferromagnetic discontinuities which cause the signal, and would compensate for detector failure modes and for ambient noise.

SUMMARY OF THE INVENTION

In one aspect of the present invention, a turbofan engine comprises a gas turbine engine and a bypass fan driven by the gas turbine engine. At least one shaft of the turbofan engine has a circular array of ferromagnetic discontinuities either formed as a portion of the shaft or attached to the shaft to rotate with the shaft. A passive magnetic sensor is positioned adjacent the circular array of ferromagnetic discontinuities, the passive magnetic sensor having at least one sensor coil whereby a sensor signal is generated in the sensor coil(s) by movement of the ferromagnetic discontinuities past the passive magnetic sensor. The sensor signal has pulses indicative of the speed of the shaft. A filter stage has an input connected to at least one of the sensor coils, the filter stage removing electrical noise from the sensor signal. A signal strength sensing circuit is connected to either the sensor coil or an output of the filter stage (typically it would only be connected to the output of the filter stage, as the zero-crossing detector acts on the output of the filter stage and it is the ratio of threshold-to-signal into the zero-crossing detector that we are trying to maintain in the 5:1 to 8:1 range. If it were connected to the input of the filter stage, the ratio would drop at higher speeds as the filter attenuates the signal). The signal strength sensing circuit generates a signal strength indicating signal based on the strength of the sensor signal. A zero crossing detector is connected to the output of the filter stage to receive the sensor signal, and is connected to the signal strength sensing circuit to receive the signal strength indicating signal. The zero crossing detector generates a clean square-wave pulse train from the sensor signal. It has an upper threshold to test for zero crossing in a positive direction and a lower threshold to test for zero crossing in a negative direction, at least one of the upper threshold and the lower threshold depending on the signal strength indicating signal. The rate or frequency of the clean square-wave pulse train is indicative of the rotary speed of the shaft and hence a speed of the turbofan engine.

In another aspect, the present invention is a speed sensing system for sensing speed of a moveable entity. The speed sensing system includes a plurality of ferromagnetic discontinuities either attached to or formed as a portion of the moveable entity. The ferromagnetic discontinuities are spaced apart in a direction of movement of the moveable entity. The speed sensing system has a passive magnetic sensor including at least one sensor coil, the passive magnetic sensor being positioned adjacent the ferromagnetic discontinuities so that movement of the moveable entity causes the ferromagnetic discontinuities to move past the passive magnetic sensor. The ferromagnetic discontinuities induce a sensor signal in the sensor coil(s). A filter stage is attached to at least one sensor coil, the filter stage removing electrical noise from the sensor signal. A signal strength sensing circuit is connected to either the sensor coil or to an output of the filter stage to receive the sensor signal. The signal strength sensing circuit produces a variable threshold signal. The variable threshold signal is a substantially monotonically non-decreasing function of the strength of the sensor signal. Generally, it increases with the strength of the sensor signal, but may be limited to a predetermined maximum. A variable threshold zero crossing detector is connected to the output of the filter stage to receive the sensor signal and to an output of the signal strength sensing circuit to receive the variable threshold signal. The variable threshold zero crossing detector has an upper threshold to test for zero crossing in a positive direction and a lower threshold to test for zero crossing in a negative direction. Either or both of the thresholds are dependent on the variable threshold signal. The variable threshold zero crossing detector generates a clean square-wave pulse train indicative of positive and negative zero crossings. The speed sensing system also has a speed indicating circuit generating a speed signal indicative of either the number of pulses per unit time, or the elapsed time between pulses.

In another aspect of the present invention, an electronic circuit measures a pulse frequency and/or a pulse period of pulses in a sensor signal originating in a sensor coil, the pulses being zero crossing pulses. The circuit includes a filter stage having an input connected to the sensor coil, the filter stage being for removing electrical noise from the sensor signal. The circuit also has a signal strength sensing circuit connected to receive the sensor signal, the signal strength sensing circuit producing a variable threshold signal, which is a substantially monotonically non-decreasing function of strength of the sensor signal. A variable threshold zero crossing detector is connected to receive the sensor signal and the variable threshold signal. The variable threshold zero crossing detector has an upper threshold to test for zero crossing in a positive direction and a lower threshold to test for zero crossing in a negative direction. One or both of the thresholds are dependent on the variable threshold signal. The variable threshold zero crossing detector generates a clean square-wave pulse train indicative of positive and negative zero crossings. The circuit also includes an output circuit generating a signal indicative of the pulse frequency and/or the pulse period.

In an additional aspect of the present invention, a microprocessor-controlled circuit measures a pulse frequency and/or a pulse period of zero crossing pulses in a sensor signal originating in a sensor coil. The microprocessor-controlled circuit includes a filter stage having an input connected to the sensor coil, the filter stage for removing electrical noise from the sensor signal. The microprocessor-controlled circuit also has a microprocessor-enabled zero crossing detector connected to an output of the filter stage, the microprocessor-enabled zero crossing detector producing a clean square-wave pulse train from the sensor signal, the zero crossing detector employing an upper threshold indicative of zero crossing in a positive direction and a lower threshold indicative of zero crossing in a negative direction. The microprocessor, preferably, receives a digital indication of the signal strength, typically via an analog-to-digital conversion of the signal strength measurement. The microprocessor then determines either or both the upper threshold and the lower threshold based on a strength of the sensor signal, and provides a signal indicative of the desired threshold to the zero-crossing detector via a digital-to-analog converter. The absolute magnitude of either or both of the thresholds is a monotonic non-decreasing function of the strength of the sensor signal. A speed indicating circuit is connected to receive the clean square-wave pulse train from the zero crossing detector, the speed indicating circuit generating an output signal indicative of either a pulse frequency or a pulse period of the sensor signal, or both.

In a further aspect, the invention is a method of measuring at least one of a pulse frequency and a pulse period of zero crossing pulses originating in a sensor coil. The method includes producing a variable threshold signal based on a strength of the sensor signal, the variable threshold signal being a substantially monotonically non-decreasing function of the strength of the sensor signal. A clean square-wave pulse train having a of uniform height is produced from the sensor signal by a zero crossing detector. The zero crossing detector has an upper threshold to detect zero crossings in the positive direction and a lower threshold to detect zero crossings in a negative direction. Either or both of the upper threshold and the lower threshold are dependent on the variable threshold signal. The method further includes processing the clean square-wave pulse train to generate a signal indicative of either the pulse frequency or the pulse period.

These and other features, aspects and advantages of the present invention will become better understood with reference to the following drawings, description and claims.

BRIEF DESCRIPTION OF THE DRAWINGS

FIG. 5 is a schematic illustration of a passive magnetic sensor;

FIG. 6 is a schematic illustration of a passive magnetic sensor having three coils;

DETAILED DESCRIPTION OF THE INVENTION

The following detailed description of the present invention is of the best currently contemplated modes of practicing the invention. The description is not to be taken in a limiting sense, but is made merely for the purpose of illustrating the general principles of the invention, since the scope of the invention is best defined by the appended claims.

Figure 1:
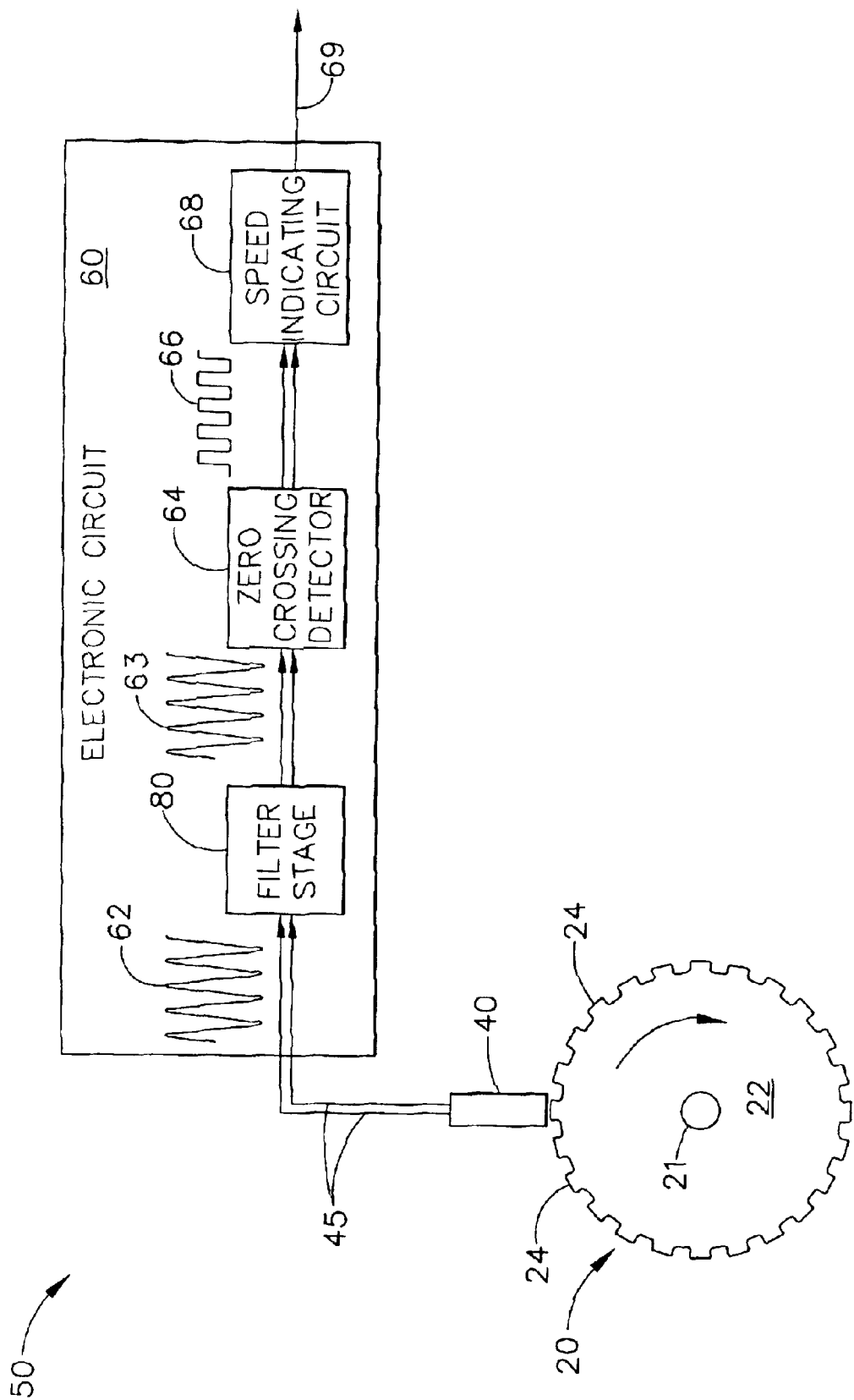
FIG. 1 is a schematic diagram of a speed measuring system having a prior art circuit for detecting sensor pulses.

The present invention provides improved methods and apparatus for measuring the speed of rotating or translating objects. FIG. 1 illustrates a prior art speed sensing system 50 for measuring the speed of a rotating shaft 21. Rotating shaft 21 has attached thereto a circular array of ferromagnetic discontinuities, generally designated 20. The circular array of ferromagnetic discontinuities 20 may, for example, be a ferromagnetic gear 22 having gear teeth 24.

A passive magnetic sensor 40 is disposed adjacent ferromagnetic gear 22 so that rotation of ferromagnetic gear 22 generates a sensor signal 62 which is imposed on sensor leads 45 and communicated to prior art electronic circuit 60. A person skilled in the art will recognize that the sensor signal 62 is a zero crossing signal, that is, a voltage in sensor signal 62 has alternating positive and negative portions. It is a generally sinusoidal signal, as suggested in FIG. 1, but may be a different waveform depending on geometry of the ferromagnetic discontinuities.

Filter stage 80 removes various types of electrical noise, thus providing a filtered sensor signal 63. Filtered sensor signal 63 enters a prior art zero crossing detector 64 which produces a clean square-wave pulse train 66.

Figure 2:
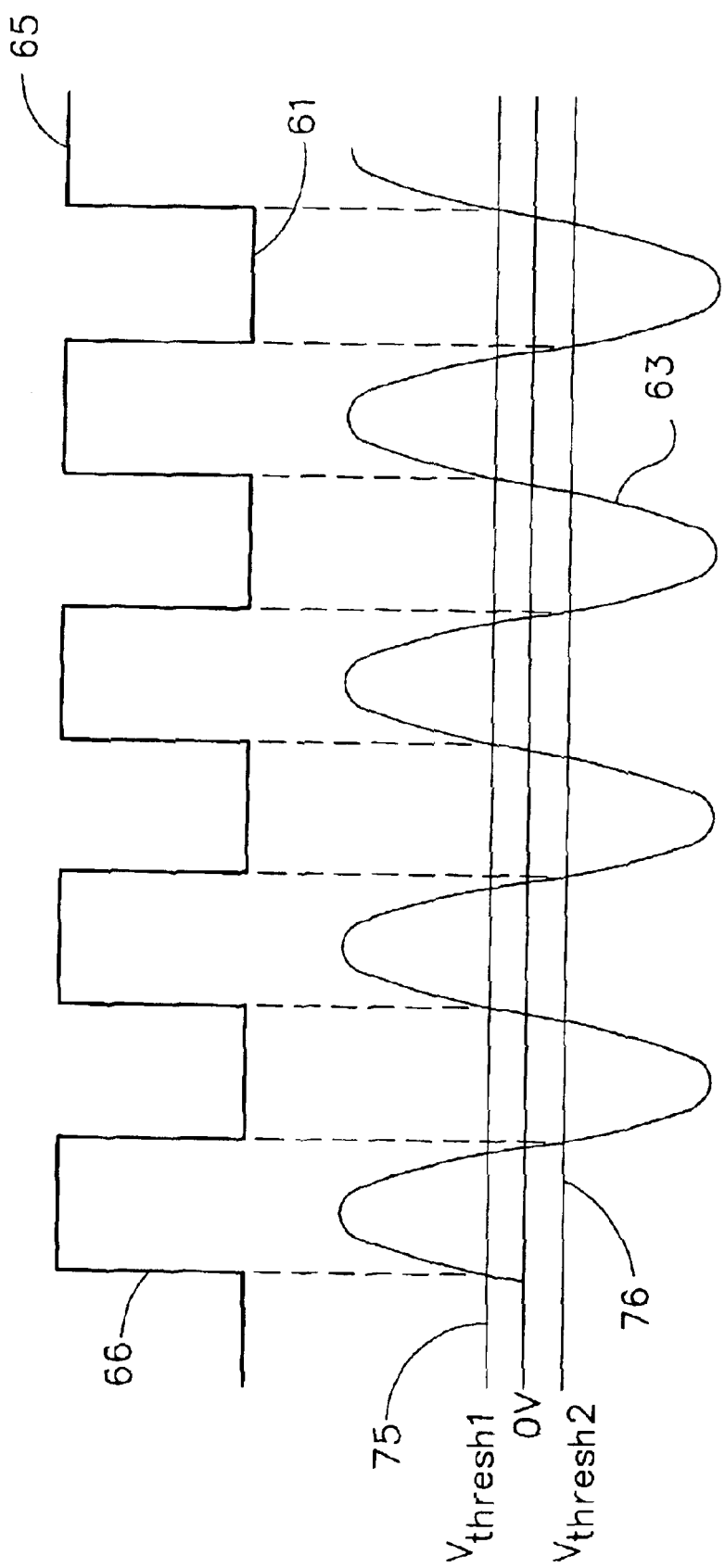
FIG. 2 is an illustration of the sensor signal waveform and the detection of pulses in a zero crossing detector.

FIG. 2 illustrates the functioning of prior art zero crossing detector 64. The instantaneous magnitude of filtered sensor signal 63 is compared to an upper threshold 75 and a lower threshold 76. When the filtered sensor signal 63 becomes greater than upper threshold 75, the amplitude of the clean square-wave pulse train 66 is set high, at the upper digital signal level 65. When the filtered sensor signal 63 becomes less than the lower threshold 76, the amplitude of the clean square-wave pulse train 66 is set low, at the lower digital signal level 61.

Clean square-wave pulse train 66 enters speed indicating circuit 68 which generates a speed indicating signal and places it on speed indicating output 69.

Figure 3:
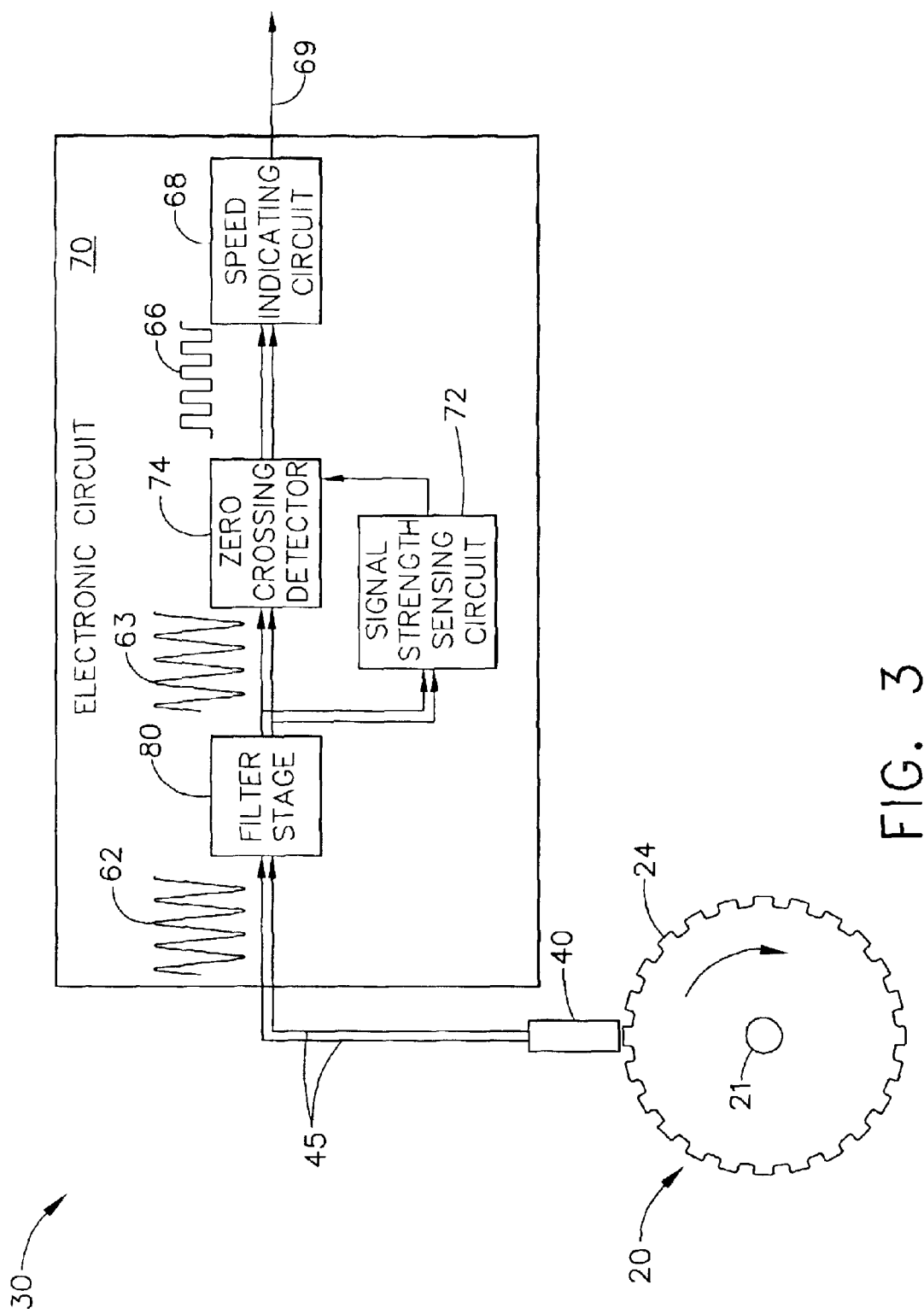
FIG. 3 is a schematic diagram of a circuit for detecting pulses, according to the present invention.

FIG. 3 illustrates a speed sensing system 30 according to the present invention. As in the prior art system illustrated in FIG. 1, rotating shaft 21 has attached thereto a circular array of ferromagnetic discontinuities 20, which may be formed as a plurality of protrusions, as may be found on a ferromagnetic gear 22 having gear teeth 24.

A passive magnetic sensor 40 may be disposed adjacent ferromagnetic gear 22 so that rotation of ferromagnetic gear 22 generates a sensor signal 62 which is imposed on sensor leads 45 and communicated to electronic circuit 70. A person skilled in the art will recognize that the sensor signal 62 is a zero crossing signal, that is, a voltage in sensor signal 62 has alternating positive and negative portions. It is a generally sinusoidal signal, as suggested in FIG. 3, but may be a different waveform depending on geometry of the ferromagnetic discontinuities.

After sensor signal 62 enters electronic circuit 70, it may enter filter stage 80 where various types of electrical noise may be removed to generate a filtered sensor signal 63. The filtered sensor signal 63 may enter a zero crossing detector 74 which detects positive and negative zero crossings to produce a clean square-wave pulse train 66.

FIG. 2 also illustrates the functioning of zero crossing detector 74. The instantaneous magnitude of filtered sensor signal 63 may be compared to an upper threshold 75 and a lower threshold 76. In some embodiments, one of these thresholds may be zero volts. When the filtered sensor signal 63 becomes greater than upper threshold 75, the amplitude of the clean square-wave pulse train 66 may be set high, at the upper digital signal level 65. When the filtered sensor signal becomes less than the lower threshold 76, the amplitude of the clean square-wave pulse train 66 may be set low, at the lower digital signal level 61. The separation between the upper threshold 75 and the lower threshold 76 may prevent the generation of spurious pulses due to noise which may still remain in filtered sensor signal 63. A person skilled in the art will recognize that the upper digital signal level 65 and the lower digital signal level 61 may be interchanged without affecting the operation of the invention.

A principal novelty of the present invention lies in the fact that the upper threshold 75 or the lower threshold 76 may be variable, based on the strength of the filtered sensor signal 63. This is in contrast to the prior art, in which both of the thresholds were set at fixed values.

To provide adjustable thresholds, the present invention may employ a signal strength sensing circuit 72, which is shown in FIG. 3. The signal strength sensing circuit 72 may be connected to receive the filtered sensor signal 63 and generate a variable threshold signal which may be communicated to zero crossing detector 74. The strength of the filtered sensor signal 63 may be determined as a peak-to-peak strength, a root mean square value, a zero to peak, or any other indicator of signal strength. Either the upper threshold 75 or the lower threshold 76, or both, may be variable and may be a monotonically non-decreasing function of the strength of filtered sensor signal 63. It may, for example, be a predetermined fraction of the peak-to-peak strength of filtered sensor signal 63. The predetermined fraction may be in the range from 0.06 to 0.1. It may have a lower limit to correspond with the lowest speed to be measured, and it may have an upper limit sufficient to exceed any anticipated noise in filtered sensor signal 63.

In one embodiment of the present invention, the upper threshold 75 may be a variable and may be a monotonically non-decreasing function of the strength of the filtered sensor signal 63. Further, in this embodiment, the lower threshold 76 may be set at the negative of the upper threshold 75.

In another embodiment, the upper threshold 75 may be a variable, dependent on the strength of filtered sensor signal 63 and the lower threshold 76 may be set at a fixed value. The lower threshold 76 may be zero.

Alternatively, the lower threshold 76 may be a variable, dependent on the strength of filtered sensor signal 63 and the upper threshold 75 may be set at a fixed value. The upper threshold 75 may be zero.

The reason for having either the upper threshold 75 or the lower threshold 76 set at a fixed value is to facilitate precise timing of the zero crossings in filtered sensor signal 63. If the upper threshold 75 is set to zero and the lower threshold 76 is a negative variable, then the leading edges of the pulses in the clean square-wave pulse train 66 correspond to zero crossings in the positive direction. By determining the lower threshold as a variable, dependent on the strength of filtered sensor signal 63, the precise timing feature is combined with the feature of having at least one threshold variable to eliminate spurious noise signals when the filtered sensor signal 63 has sufficient strength.

Figure 4:
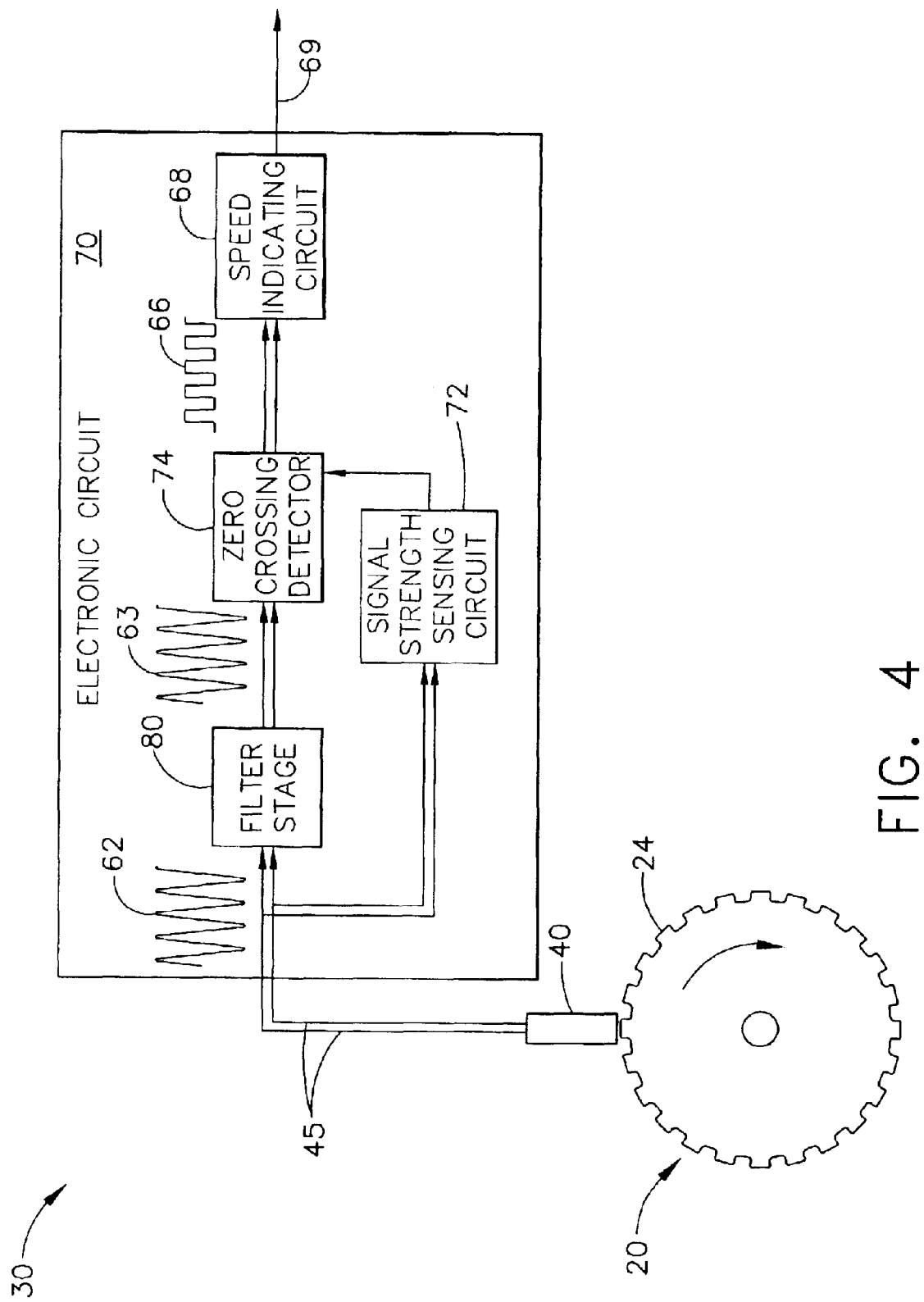
FIG. 4 is a schematic diagram of an alternative embodiment of the present invention.

FIG. 4 illustrates a variant on the speed sensing system 30 of the present invention. In this case, the signal strength sensing circuit 72 may generate a variable threshold signal based on the strength of the sensor signal 62 prior to filtration. Either the upper threshold 75 or the lower threshold 76 may be variable and may be a monotonically non-decreasing function of the strength of filtered sensor signal 63.

FIGS. 3 and 4 further show a speed indicating circuit 68. Speed indicating circuit 68 may be connected to receive the clean square-wave pulse train 66 from the zero crossing detector 74. Speed indicating circuit 68 may generate a speed signal which is indicative of either a number of pulses per unit time, or a period of the pulses. The speed signal may be placed on speed indicating output 69 for use by other circuitry or controls (not shown). A variety of types of speed indicating circuit 68 are known in the art. In some applications, this is done directly by a microprocessor or timer circuit timing a number of periods of the pulse train—a direct frequency-to-digital measurement. In other embodiments, the speed indicating circuit may be an analog circuit that converts frequency to a voltage. The voltage is either used directly, or in microprocessor systems it is converted to a digital signal via an analog-to-digital converter. In microprocessor-based systems, the direct frequency-to-digital conversion is preferred because of its inherently greater accuracy.

FIG. 5 is a schematic illustration of the passive magnetic sensor 40. It may have a magnet 42, a ferromagnetic core 47 and a sensor coil 44 having sensor leads 45. When any ferromagnetic object moves toward the lower end of ferromagnetic core 47, the flux in ferromagnetic core 47 increases, and by Gauss's law, an emf is induced in sensor coil 44. When the ferromagnetic object moves away from ferromagnetic core 47, the flux through ferromagnetic core 47 decreases and an opposite emf is induced in sensor coil 44 and therefore applied to sensor leads 45.

When passive magnetic sensor 40 is placed near a circular array of ferromagnetic discontinuities 20, specifically ferromagnetic gear 22, and rotation of the circular array of ferromagnetic discontinuities 20 occurs, then alternating opposite emf's are induced in sensor coil 44 and applied to sensor leads 45. A person skilled in the art will recognize that the magnetic poles, N and S may be interchanged without affecting the basic operation of the invention.

FIG. 6 is a schematic illustration of a sensor with three coils 48, having three of the sensor coils 44. A person skilled in the art will recognize that three copies of the circuitry taught in this invention may be employed for converting the signal of each coil. Note that failures of one coil may affect the signal strength of the other coils.

Figure 7:
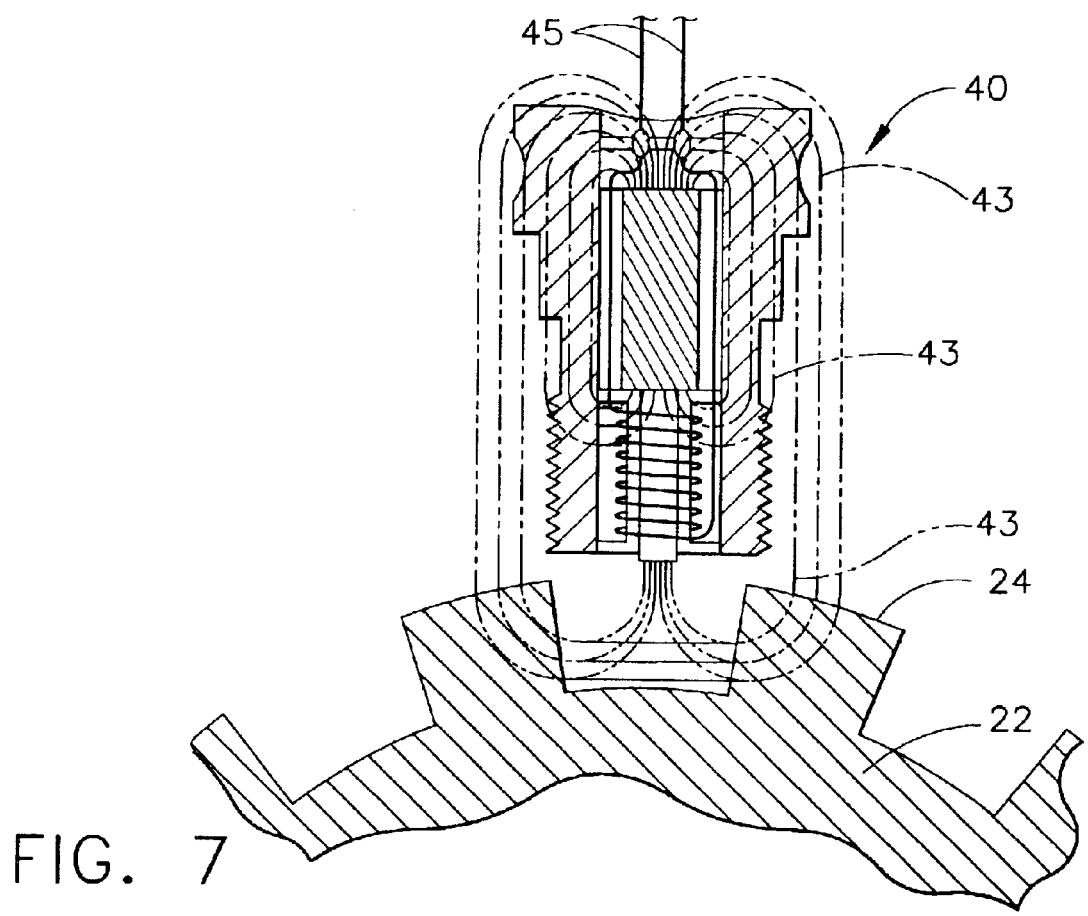
FIG. 7 is an illustration of a passive magnetic sensor adjacent a gap between ferromagnetic discontinuities.
Figure 8:
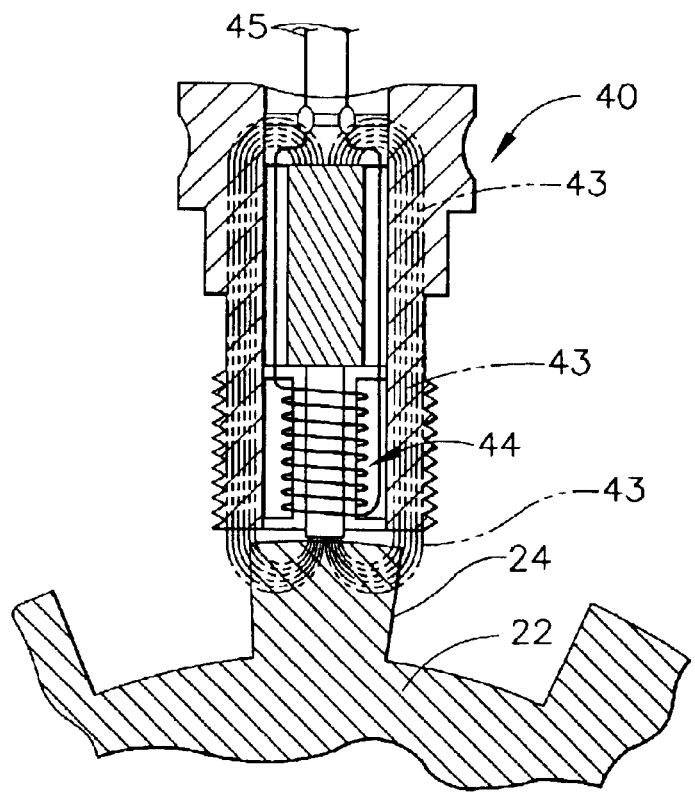
FIG. 8 is an illustration of the sensor of FIG. 7 adjacent a ferromagnetic discontinuity.

FIGS. 7 and 8 illustrate a passive magnetic sensor 40 adjacent a rotating ferromagnetic gear 22 having gear teeth 24. In FIG. 7, the passive magnetic sensor 40 is adjacent a gap between gear teeth 24. Magnetic field lines 43 are sketched in this figure. FIG. 8 shows the passive magnetic sensor 40 and ferromagnetic gear 22 with one of the gear teeth 24 adjacent the passive magnetic sensor 40. The magnetic field lines 43 are changed from the configuration shown in FIG. 7. A person skilled in the art will recognize that the magnetic field lines are changed by the rotation of ferromagnetic gear 22. As the magnetic field is changing, an emf will be induced in sensor coil 44 and applied to sensor leads 45.

Figure 9:
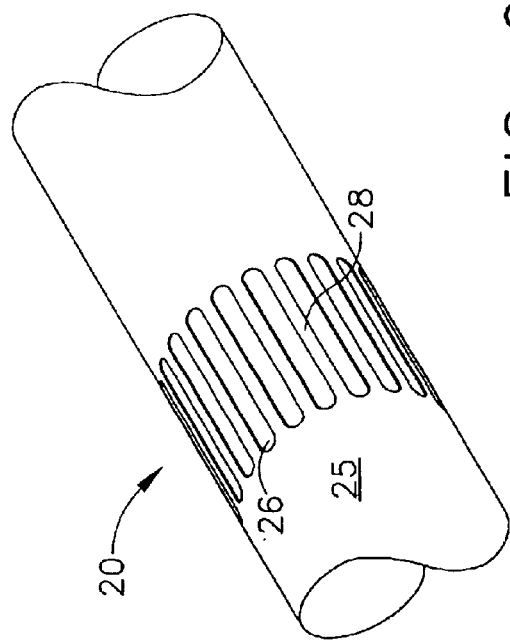
FIG. 9 Illustrates ferromagnetic discontinuities delineated by slots in a shaft.

FIG. 9 illustrates an alternative form of the circular array of ferromagnetic discontinuities 20. In this case, the circular array of ferromagnetic discontinuities 20 may be a ferromagnetic shaft 25 having slots 26 formed therein. Interspersed between slots 26 are slot-delineated ferromagnetic discontinuities 28 which have the same function as gear teeth 24 in the preceding embodiment.

Figure 10:
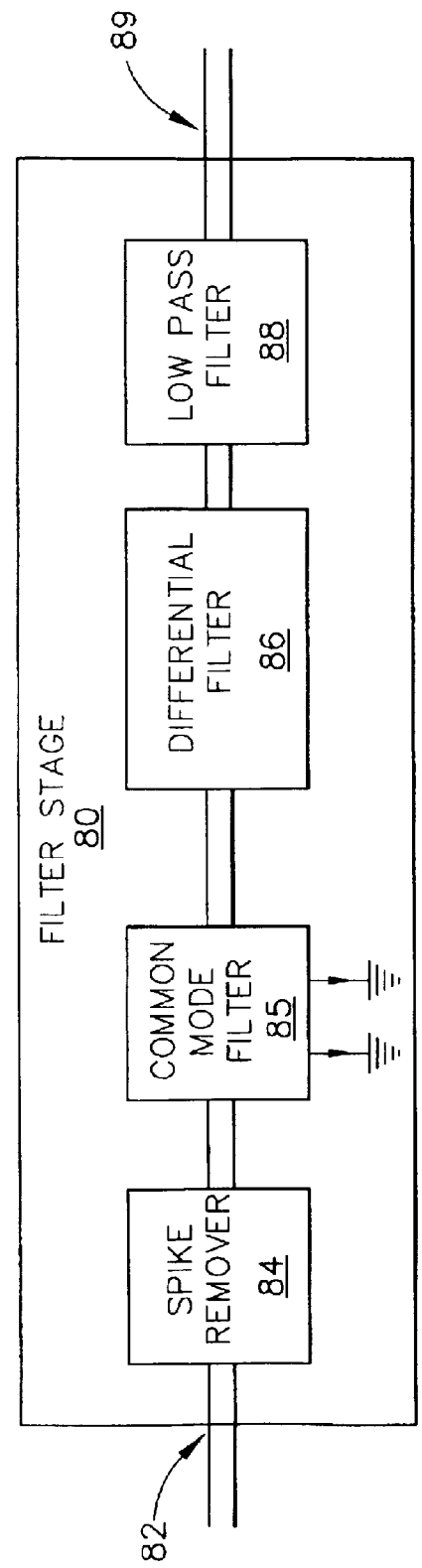
FIG. 10 is a schematic illustration of the filter stage employed to reduce electrical noise.

FIG. 10 provides further detail regarding filter stage 80. Filter stage 80 may have a filter stage input 82 and a filter stage output 89. It may have a spike remover 84 which may, for example, act as a clipper to limit the magnitude of strong, brief signals. A common mode filter 85 may be included. Common mode filter 85 eliminates signals which are present on both of the sensor leads 45. Filter stage 80 may further have a differential filter 86, which accepts only differential signals. Filter stage 80 may also include a low pass filter 88 to eliminate brief transient signals which might be counted as pulses by zero crossing detector 74. Typically, a low pass filter and a differential filter have similar functions and it is not necessary to have both in the same embodiment. It should be noted that the filter stage 80 provides a somewhat increased real threshold as frequency or speed increases. The present invention maintains the optimum 1/5-1/8 ratio not just in the presence of changing speeds, but also with different pickup tip-to-discontinuity gaps due to manufacturing variation, and with pickup coil failure modes. In addition, it allows lower thresholds at low speeds, which permits use of pickups with thicker, less failure-prone wire, while increasing the threshold at higher speeds to minimize noise sensitivity.

Figure 11:
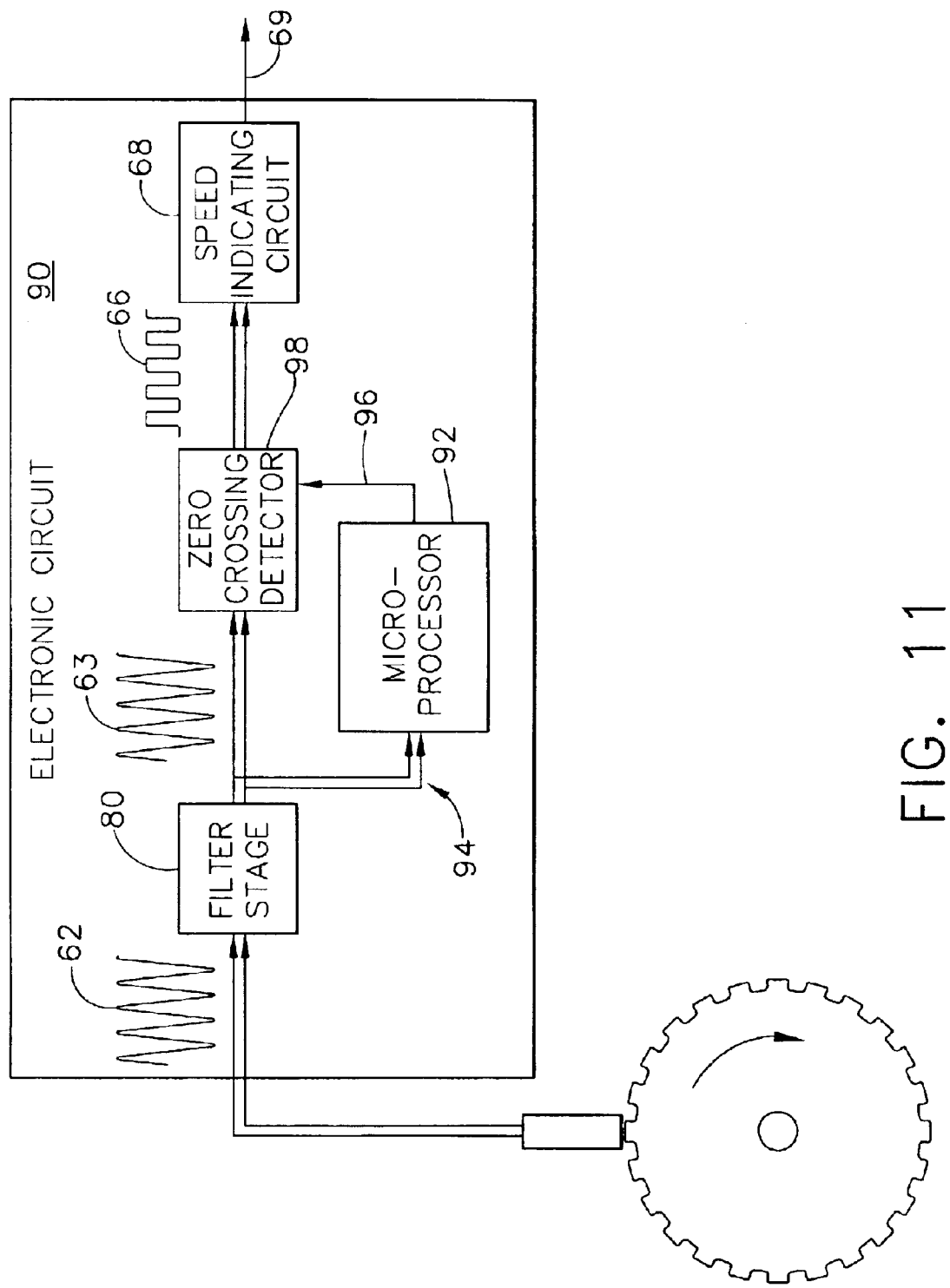
FIG. 11 illustrates a microprocessor-controlled circuit having a microprocessor for determining one or more thresholds of a microprocessor-enabled zero crossing detector.

FIG. 11 illustrates a microprocessor-controlled circuit 90 including a filter stage 80, a microprocessor-enabled zero crossing detector 98 and a speed indicating circuit 68. Microprocessor-controlled circuit 90 may further have a microprocessor 92 having a microprocessor input 94 connected to receive the filtered sensor signal 63. Microprocessor 92 may determine one or both the upper threshold 75 and the lower threshold 76 (shown in FIG. 2) and place them on microprocessor output 96 for use in microprocessor-enabled zero crossing detector 98. The magnitude of the upper threshold 75 and the lower threshold 76 may be monotonically non-decreasing functions of the strength of the filtered sensor signal 63. Microprocessor-controlled circuit 90 has the advantage that the algorithms for determination of the upper threshold 75 and the lower threshold 76 may be changed in the field by reprogramming the microprocessor 92.

Figure 12:
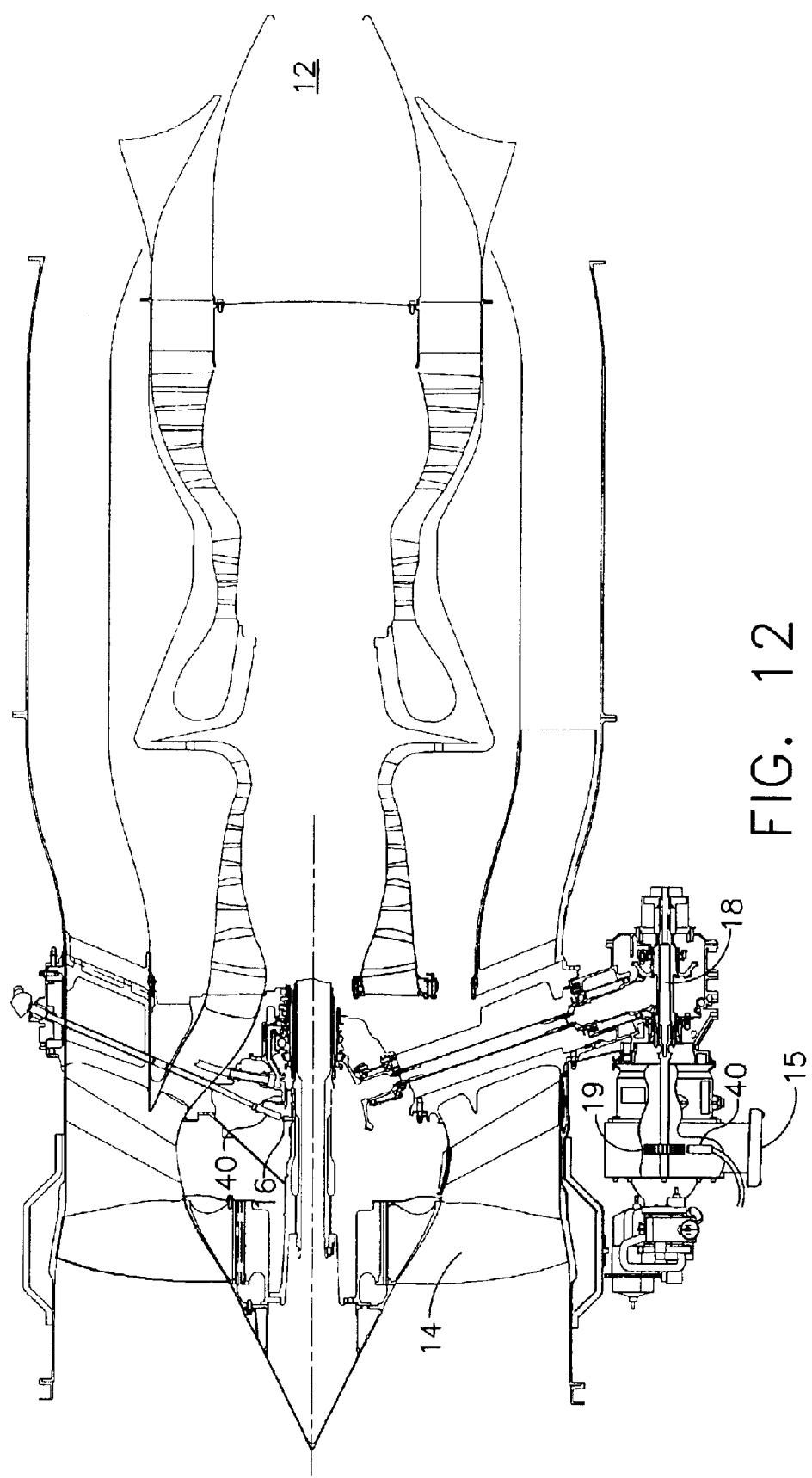
FIG. 12 is a schematic illustration the invention applied to a turbofan jet engine.

FIG. 12 illustrates a turbofan engine, generally designated 10, having a gas turbine engine 12 which drives a bypass fan 14. Gas turbine engine 12 has an auxiliary gearbox 15 having an auxiliary ferromagnetic gear 19 on gearbox shaft 18. A passive magnetic sensor 40 is placed adjacent to auxiliary ferromagnetic gear 19 to generate a sensor signal 62 (shown in previous figures). The sensor signal 62 may be processed by electronic circuit 70 or microprocessor-controlled circuit 90 (shown in previous figures) to obtain the speed of turbofan engine 10. Turbofan engine 10 may, for example, be the AS900 turbofan engine.

FIG. 12 illustrates a second application of the present invention to the turbofan engine 10. A passive magnetic sensor 40 may be placed adjacent ferromagnetic gear like ring 16 which rotates with bypass fan 14, to obtain a sensor signal 62 which, likewise, may be processed in an electronic circuit 70 or a microprocessor-controlled circuit 90. The speed so obtained is the speed of bypass fan 14. One tooth of the gear-like ring may be missing for indexing, to indicate the angular position of bypass fan 14.

It should be understood, of course, that the foregoing relates to preferred embodiments of the invention and that modifications may be made without departing from the spirit and scope of the invention as set forth in the following claims.

We claim:

1. A turbofan engine comprising:
   a gas turbine engine;
   a bypass fan driven by said gas turbine engine;
   at least one rotating portion of said turbofan engine having a circular array of ferromagnetic discontinuities disposed thereon, said circular array of ferromagnetic discontinuities being at least one of formed as a portion of and attached to said rotating portion of said gas turbine engine to rotate therewith;
   a passive magnetic sensor positioned adjacent said circular array of ferromagnetic discontinuities, said passive magnetic sensor having at least one sensor coil whereby a sensor signal is generated in said a least one sensor coil by movement of said ferromagnetic discontinuities past said passive magnetic sensor, said sensor signal including pulses indicative of said speed of said shaft;
   a filter stage having an input connected to said at least one sensor coil to receive said sensor signal, said filter stage for removing electrical noise from said sensor signal to provide a filtered sensor signal;
   a signal strength sensing circuit connected to receive one of said sensor signal and said filtered sensor signal, said signal strength sensing circuit generating a variable threshold signal indicative of a strength of said one of said sensor signal and said filtered sensor signal;
   a zero crossing detector connected to said output of said filter stage to receive said sensor signal, and connected to said signal strength sensing circuit to receive said variable threshold signal, said zero crossing detector for generating a clean square-wave pulse train from said sensor signal, said zero crossing detector having an upper threshold to test for zero crossing in a positive direction and a lower threshold to test for zero crossing in a negative direction, at least one of said upper threshold and said lower threshold dependent on said variable threshold signal, and said clean square-wave pulse train indicative of a rotary speed of said rotating portion of said turbofan engine and hence a speed of said turbofan engine; wherein
   at least one of a) said upper threshold equals about 0.06 to 0.1 times a peak to peak strength of said one of said sensor signal and said filtered sensor signal, said upper threshold having a lower limit corresponding to a lowest speed to be sensed; and b) said lower threshold equals about −0.06 to −0.1 times a peak to peak strength of said one of said sensor signal and said filtered sensor signal, said lower threshold having an upper limit corresponding to a lowest speed to be sensed.

2. The turbofan engine of claim 1, wherein said circular array of ferromagnetic discontinuities is formed as at least one of a ferromagnetic gear and a gear-like ring.

3. The turbofan engine of claim 1, wherein said rotating portion of said turbofan engine is said bypass fan.

4. The turbofan engine of claim 1, wherein said rotating portion of said turbofan engine is a gearbox shaft in a gearbox of said turbofan engine, said gearbox shaft driven by said gas turbine engine.

5. A speed sensing system for sensing speed of a rotating shaft, said speed sensing system comprising:
   a plurality of ferromagnetic discontinuities being at least one of attached to and formed as a portion of said shaft, said ferromagnetic discontinuities spaced apart in a direction of rotation of said shaft;
   a passive magnetic sensor including at least one sensor coil, said passive magnetic sensor positioned adjacent said ferromagnetic discontinuities whereby rotation of said shaft causes said ferromagnetic discontinuities to move past said passive magnetic sensor, said ferromagnetic discontinuities inducing a sensor signal in said at least one sensor coil, said sensor signal including pulses indicative of said speed of said shaft;
   a filter stage attached to said sensor coil, said filter stage for removing electrical noise from said sensor signal to provide a filtered sensor signal;
   a signal strength sensing circuit connected to receive at least one of said sensor signal and said filtered sensor, said signal strength sensing circuit producing a variable threshold signal, said variable threshold signal being a substantially monotonically non-decreasing function of a strength of said at least one of said sensor signal and said filtered sensor signal;

a variable threshold zero crossing detector connected to said output of said filter stage to receive said sensor signal and to an output of said signal strength sensing circuit to receive said variable threshold signal, said variable threshold zero crossing detector having an upper threshold to test for zero crossing in a positive direction and a lower threshold to test for zero crossing in a negative direction, at least one of said upper threshold and said lower threshold dependent on said variable threshold signal, said variable threshold zero crossing detector generating a clean square-wave pulse train indicative of positive and negative zero crossings; and a speed indicating circuit connected to receive said clean square-wave pulse train, said speed indicating circuit generating a speed indicating signal indicative of at least one of a frequency of said clean square-wave pulse train and a period of said clean square-wave pulse train, and hence of said sensor signal;

wherein said variable threshold signal is based on a peak to peak strength of said at least one of said sensor signal and said filtered sensor signal, an absolute magnitude of at least one of said upper threshold and said lower threshold being a predetermined fraction of said peak to peak strength of said at least one of said sensor signal and said filtered sensor signal with a lower limit corresponding to a lowest speed to be measured.

6. The speed sensing system of claim 5, wherein said ferromagnetic discontinuities are comprised in a gear, said gear attached to said shaft.

7. The speed sensing system of claim 5, wherein said shaft is ferromagnetic and said ferromagnetic discontinuities are delineated by slots formed in said shaft.

8. The speed sensing system of claim 5, wherein said filter stage includes at least one of a spike remover, a common mode filter, a differential filter, and a low pass filter.

9. The speed sensing system of claim 5, wherein said signal strength sensing circuit is connected to said output of said filter stage to receive said filtered sensor signal.

10. The speed sensing system of claim 5, wherein said predetermined fraction is in a range from about 0.06 to about 0.1.

11. The speed sensing system of claim 5 wherein said upper threshold has a positive value based on said variable threshold signal and said lower threshold has a value equal to a negative of said value of said upper threshold.

12. The speed sensing system of claim 5 wherein an absolute magnitude of at least one of said upper threshold and said lower threshold is a predetermined fraction of a zero to peak value of said at least one of said sensor signal and said filtered sensor signal, with a lower limit corresponding to a lowest speed to be measured.

13. The speed sensing system of claim 5 wherein an absolute magnitude of at least one of said upper threshold and said lower threshold is a predetermined fraction of an RMS value of said at least one of said sensor signal and said filtered sensor signal, with a lower limit corresponding to a lowest speed to be measured.

14. An electronic circuit for measuring at least one of a frequency and a period of a sensor signal originating in a sensor coil, said sensor signal being a zero crossing signal, said circuit comprising:

a filter stage having an input connected to said sensor coil, said filter stage for removing electrical noise from said sensor signal to provide a filtered sensor signal;

a signal strength sensing circuit connected to receive at least one of said sensor signal and said filtered sensor signal, said signal strength sensing circuit producing a variable threshold signal, said variable threshold signal being a substantially monotonically non-decreasing function of a strength of said at least one of said sensor signal and said filtered sensor signal;

a variable threshold zero crossing detector connected to receive said sensor signal and said variable threshold signal, said variable threshold zero crossing detector having an upper threshold to test for zero crossing in a positive direction and a lower threshold to test for zero crossing in a negative direction, at least one of said upper threshold and said lower threshold dependent on said variable threshold signal, said variable threshold zero crossing detector generating a clean square-wave pulse train indicative of positive and negative zero crossings; and a speed indicating circuit generating a speed indicating signal indicative of at least one of said frequency and said period of said clean square-wave pulse train and hence of said sensor signal;

wherein an absolute magnitude of said at least one of said upper threshold and said lower threshold is selected from the group consisting of a) a predetermined fraction of a peak to peak strength of said at least one of said sensor signal and said filtered sensor signal with a lower limit corresponding to a lowest frequency of said sensor signal to be measured, b) a predetermined fraction of an RMS value of said at least one of said sensor signal and said filtered sensor signal with a lower limit corresponding to a lowest frequency of said sensor signal to be measured, and c) a predetermined fraction of a zero to peak value of said at least one of said sensor signal and said filtered sensor signal with a lower limit corresponding to a lowest frequency of said sensor signal to be measured.

15. The electronic circuit of claim 14, wherein said filter stage includes at least one of a spike remover to remove electrical noise spikes, a common mode filter, a differential filter, and a low pass filter.

16. The electronic circuit of claim 15, wherein said filter stage includes a low pass filter, a cut off frequency of said low pass filter being set to pass a lowest frequency of said sensor signal to be measured.

17. The electronic circuit of claim 14, wherein said signal strength sensing circuit is connected to an output of said filter to receive said filtered sensor signal.

18. The electronic circuit of claim 14, wherein an absolute magnitude of said at least one of said upper threshold and said lower threshold is a predetermined fraction of a peak to peak strength of said at least one of said sensor signal and said filtered sensor signal with a lower limit corresponding to a lowest frequency of said sensor signal to be measured.

19. The electronic circuit of claim 18, wherein said predetermined fraction is in a range from about 0.06 to 0.1.

20. The electronic circuit of claim 14, wherein an absolute magnitude of at least one of said upper threshold and said lower threshold is a predetermined fraction of an RMS value of said at least one of said sensor signal and said filtered sensor signal with a lower limit corresponding to a lowest frequency of said sensor signal to be measured.

21. The electronic circuit of claim 14, wherein an absolute magnitude of at least one of said upper threshold and said lower threshold is a predetermined fraction of a zero to peak value of said at least one of said sensor signal and said filtered sensor signal with a lower limit corresponding to a lowest frequency of said sensor signal to be measured.

22. A method of measuring at least one of a frequency and a period of a zero crossing signal originating in a sensor coil, said method comprising:

producing a variable threshold signal based on a strength of said sensor signal, said variable threshold signal being a substantially monotonically non-decreasing function of said strength of said sensor signal;

generating a clean square-wave pulse train from said sensor signal by a zero crossing detector, said zero crossing detector having an upper threshold and a lower threshold, at least one of said upper threshold and said lower threshold dependent on said variable threshold signal;

selecting the absolute magnitude of said at least one of said upper threshold and said lower threshold from the group consisting of a) a predetermined fraction of a peak to peak strength of said at least one of said sensor signal and said filtered sensor signal with a lower limit corresponding to a lowest frequency of said sensor signal to be measured, b) a predetermined fraction of an RMS value of said at least one of said sensor signal and said filtered sensor signal with a lower limit corresponding to a lowest frequency of said sensor signal to be measured, and c) a predetermined fraction of a zero to peak value of said at least one of said sensor signal and said filtered sensor signal with a lower limit corresponding to a lowest frequency of said sensor signal to be measured; and processing said clean square-wave pulse train to generate a speed indicating signal indicative of at least one of a frequency and a period of said clean square-wave pulse train and hence of said sensor signal.

23. The method of claim 22, further including filtering said sensor signal to remove electrical noise from said sensor signal.

24. The method of claim 23, wherein said filtering includes at least one of removing spikes from said sensor signal, common mode filtration, differential filtration, and low pass filtration.

25. A turbofan engine comprising:

a gas turbine engine;

a bypass fan driven by said gas turbine engine;

at least one rotating portion of said turbofan engine having a circular array of ferromagnetic discontinuities disposed thereon, said circular array of ferromagnetic discontinuities comprising a plurality of protrusions, said plurality of protrusions being at least one of formed as a portion of and attached to said rotating portion of said gas turbine engine to rotate therewith;

a passive magnetic sensor positioned adjacent said circular array of ferromagnetic discontinuities, said passive magnetic sensor having multiple sensor coils whereby a sensor signal is generated in said sensor coils by movement of said ferromagnetic discontinuities past said passive magnetic sensor, said sensor signal including pulses indicative of said speed of said shaft;

a filter stage having an input connected to said sensor coils to receive said sensor signal, said filter stage for removing electrical noise from said sensor signal to provide a filtered sensor signal;

a signal strength sensing circuit connected to receive said filtered sensor signal, said signal strength sensing circuit generating a variable threshold signal indicative of a strength of said filtered sensor signal;

a zero crossing detector connected to an output of said filter stage to receive said sensor signal, and said zero crossing detector further connected to said signal strength sensing circuit to receive said variable threshold signal, said zero crossing detector for generating a clean square-wave pulse train from said sensor signal, said zero crossing detector having an upper threshold to test for zero crossing in a positive direction and a lower threshold to test for zero crossing in a negative direction, at least one of said upper threshold and said lower threshold dependent on said variable threshold signal, and said clean square-wave pulse train indicative of a rotary speed of said rotating portion of said turbofan engine.

26. The turbofan engine of claim 25, wherein said circular array of ferromagnetic discontinuities is formed as at least one of a ferromagnetic gear and a gear-like ring.

27. The turbofan engine of claim 25, wherein at least at one of a) said upper threshold equals about 0.06 to 0.1 times a peak to peak strength of said one of said sensor signal and said filtered sensor signal, said upper threshold having a lower limit corresponding to a lowest speed to be sensed; and b) said lower threshold equals about −0.06 to −0.1 times a peak to peak strength of said one of said sensor signal and said filtered sensor signal, said lower threshold having an upper limit corresponding to a lowest speed to be sensed.

28. The turbofan engine of claim 25, wherein said rotating portion of said turbofan engine is said bypass fan.

29. The turbofan engine of claim 25, wherein said rotating portion of said turbofan engine is a gearbox shaft in a gearbox of said turbofan engine, said gearbox shaft driven by said gas turbine engine.

* * * * *